(12) United States Patent
Bienvenu et al.

(10) Patent No.: US 12,103,245 B2
(45) Date of Patent: Oct. 1, 2024

(54) ASSEMBLY OF AN OUTLET GUIDE VANE FOR AN AIRCRAFT TURBINE ENGINE USING A REDUCED-SIZE VACUUM SHEET

(71) Applicant: SAFRAN AIRCRAFT ENGINES, Paris (FR)

(72) Inventors: Steven Gérard Joseph Bienvenu, Moissy-Cramayel (FR); Pierre Antoine Bossan, Moissy-Cramayel (FR); Damien Bruno Lamouche, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 495 days.

(21) Appl. No.: 17/434,783

(22) PCT Filed: Feb. 28, 2020

(86) PCT No.: PCT/FR2020/050396
§ 371 (c)(1),
(2) Date: Aug. 30, 2021

(87) PCT Pub. No.: WO2020/178510
PCT Pub. Date: Sep. 10, 2020

(65) Prior Publication Data
US 2022/0134679 A1 May 5, 2022

(30) Foreign Application Priority Data
Mar. 4, 2019 (FR) ........................................ 1902203

(51) Int. Cl.
*B29C 65/00* (2006.01)
*B29C 65/48* (2006.01)
(Continued)

(52) U.S. Cl.
CPC ...... *B29C 65/4835* (2013.01); *B29C 65/7805* (2013.01); *B29C 66/00145* (2013.01);
(Continued)

(58) Field of Classification Search
CPC . B29C 65/4835; B29C 65/70; B29C 65/7847; B29C 66/00145; B29C 66/82423
See application file for complete search history.

(56) References Cited

U.S. PATENT DOCUMENTS 4,560,428 A * 12/1985 Sherrick ............. B29C 65/4835
156/286
2003/0019567 A1* 1/2003 Burpo ................. B29C 65/4835
156/286

(Continued)

FOREIGN PATENT DOCUMENTS

| EP | 3434867 A1 | 1/2019 |
| FR | 2990642 A1 | 11/2013 |
| WO | 2013178963 A1 | 12/2013 |

OTHER PUBLICATIONS

International Search Report for issued in Application No. PCT/FR2020/050396 dated Jul. 3, 2020.
Written Opinion for PCT/FR2020/050396 dated Jul. 3, 2020.

*Primary Examiner* — Philip C Tucker
*Assistant Examiner* — Nickolas R Harm
(74) *Attorney, Agent, or Firm* — Pearne & Gordon LLP

(57) ABSTRACT

A method for assembling a body and a cover of a vane by polymerisation of a resin. The covens positioned on a junction face of the body covered with this resin. A sheet is placed against a pressure side of the vane, formed by an outer face of the cover and an outer face of the body, so as to define a space sealed with a bead of mastic sealant. The bead of mastic sealant is deposited on the outer face of the body, around the junction face of this body. The space between the sheet and the pressure side of the vane is placed (Continued)

under vacuum during a heating operation of the vane in an autoclave, in order to press the cover against the body of the vane.

8 Claims, 3 Drawing Sheets

(51) Int. Cl.
| | | |
|---|---|---|
| *B29C 65/78* | (2006.01) | |
| *F01D 5/14* | (2006.01) | |
| *F16B 11/00* | (2006.01) | |
| B29C 65/70 | (2006.01) | |
| B29K 63/00 | (2006.01) | |
| B29L 31/08 | (2006.01) | |

(52) U.S. Cl.
CPC .......... *B29C 66/8161* (2013.01); *F01D 5/147* (2013.01); *F16B 11/006* (2013.01); *B29C 65/70* (2013.01); *B29C 65/7847* (2013.01); *B29C 66/82423* (2013.01); *B29K 2063/00* (2013.01); *B29L 2031/082* (2013.01); *F05D 2220/36* (2013.01); *F05D 2230/60* (2013.01)

(56) References Cited

U.S. PATENT DOCUMENTS

| | | | |
|---|---|---|---|
| 2013/0309096 A1* | 11/2013 | Le Bras | B29C 66/8266 |
| | | | 156/499 |
| 2019/0016039 A1* | 1/2019 | Drees | B29C 70/44 |
| 2019/0353040 A1* | 11/2019 | Robertson, Jr. | B29C 70/682 |

* cited by examiner

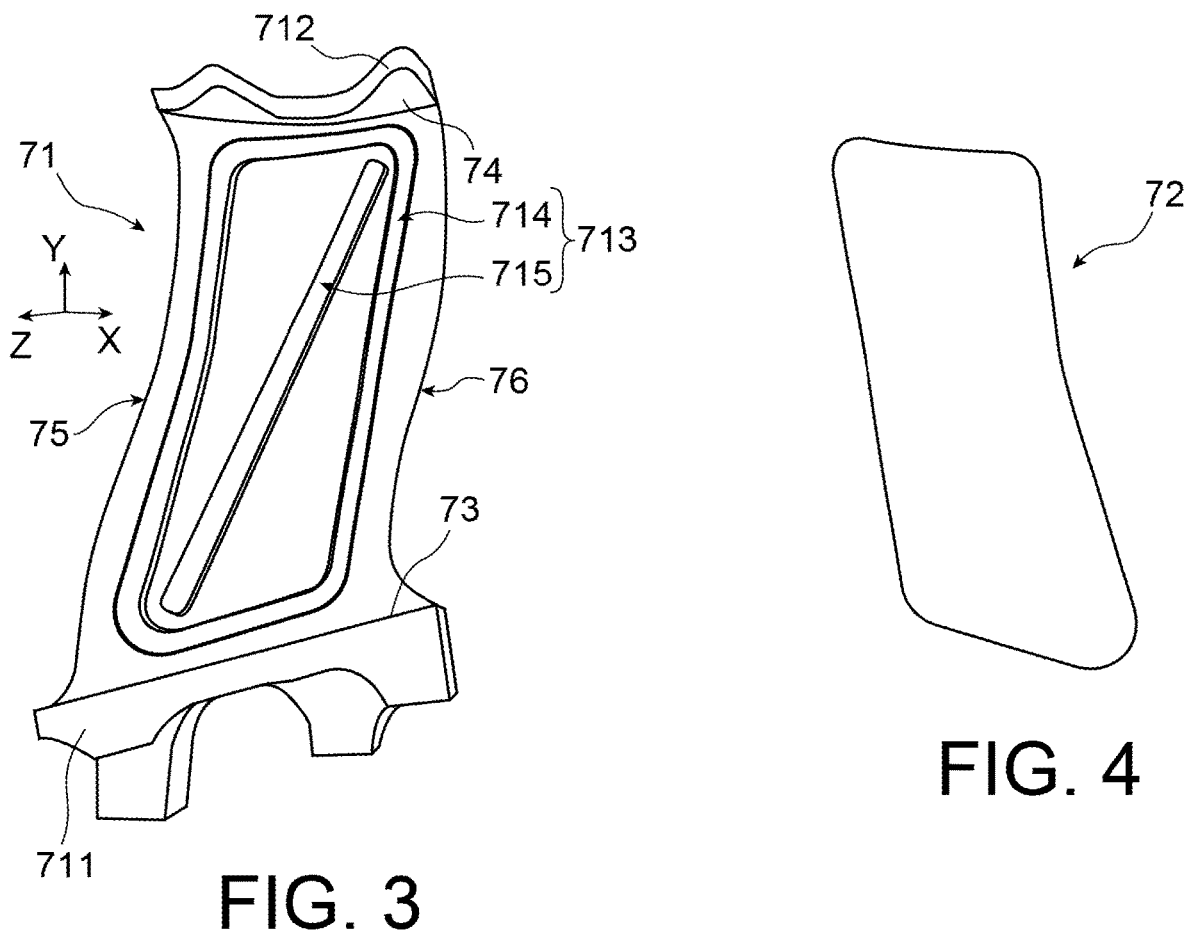
FIG. 3
FIG. 4
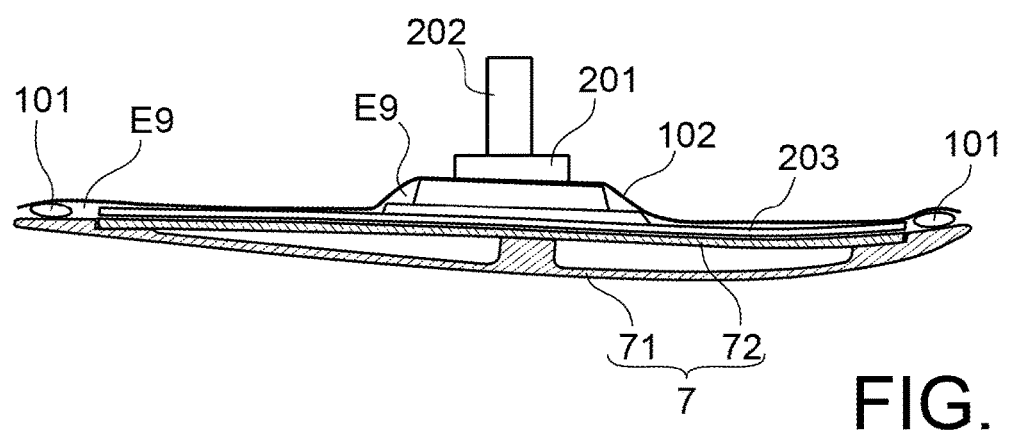
FIG. 5

ASSEMBLY OF AN OUTLET GUIDE VANE FOR AN AIRCRAFT TURBINE ENGINE USING A REDUCED-SIZE VACUUM SHEET

This is the National Stage of PCT international application PCT/FR2020/050396, filed on Feb. 28, 2020 entitled "ASSEMBLY OF AN OUTLET GUIDE VANE FOR AN AIRCRAFT TURBINE ENGINE USING A REDUCED-SIZE VACUUM SHEET", which claims the priority of French Patent Application No. 1902203 filed Mar. 4, 2019, both of which are incorporated herein by reference in their entirety.

TECHNICAL FIELD

The present invention is concerned with the field of aircraft turbomachines of the turbofan engine type, and in particular with the manufacture of guide vanes exposed to the secondary air flow circulating in the secondary stream of such a turbojet engine.

These guide vanes are preferably intended to form an outlet guide vane, also known as an "OGV", designed to straighten the secondary air flow at the outlet of the turbojet engine.

STATE OF PRIOR ART

Producing an outlet guide vane generally requires assembling two prefabricated parts. One of these parts forms a body of the vane which includes recesses designed to reduce its mass. This body includes especially a first outer face forming a back side of the vane. The other part is a cover arranged to be attached to the body so as to form, together with a second outer face of the body, a front side of the vane.

In the state of prior art, attaching the body and cover is generally achieved by bonding these parts together using a polymerisable resin. Polymerising involves heating the resin, typically to a temperature of between 160° C. and 180° C., in a configuration in which the cover is held pressed against the body.

To do this, a conventional technique is to place the body and cover in a hermetic bag, vaccumise this bag, and then heat this assembly within an autoclave. Vacuumising the bag makes it possible to avoid the appearance of porosities in the polymerised resin seal, such porosities being likely to appear under the effect of the gas evolution produced by the resin when polymerised. The pressure differential between the interior of the bag, which is under vacuum, and the autoclave enclosure generates a force for pressing the cover against the body, which is capable of forming a resin seal with optimum thickness, typically between 80 μm and 300 μm, and ensuring proper adhesion at the seal-body and seal-cover interfaces. The pressing force typically corresponds to a relative pressure of between $1*10^5$ Pa and $5*10^5$ Pa.

This technique has several drawbacks. Especially, the placement of the body and the cap in the hermetic bag is a long and delicate step during which the bag can be perforated or torn. Indeed, at this stage in the manufacture of the vane, the body and cover typically include sharp edges or cutting projecting parts. A perforation or tear in the bag prevents it from being vacuumised and properly docked with the body and cover, typically resulting in geometric and mechanical defects in the vane. Furthermore, such a hermetic bag is a single-use consumable that is virtually impossible to repair, as a bag that has already been used may have microperforations invisible to the naked eye and/or large tears. Furthermore, the excess bag parts about the vane form folds which can induce turbulence in the gas flow within the autoclave, such turbulence can lead to differences in heating temperature between different parts of the vane.

One purpose of the present invention is to provide a method for assembling a vane and a tooling which improves assembling reliability.

Another purpose of the invention is to reduce assembling time.

DISCLOSURE OF THE INVENTION

To this end, one object of the invention is a method for assembling a vane for an outlet guide vane of an aircraft turbofan engine, comprising:
an operation of depositing a polymerisable resin onto a junction face of a body of said vane,
an operation of positioning a cover of the vane on the resin-covered junction face so that an outer face of the cover and an outer face of the body together form a front side of this vane,
a step of placing a sheet against the front side of the vane,
an operation of vacuumising a space included between the cover and the front side,
a heating operation capable of polymerising the resin and thus attaching the cover to the body of the vane.

According to the invention, this method comprises, before or during the operation of placing the sheet against the front side of the vane, an operation of depositing a bead of sealant onto the outer face of the body, about the junction face of the body, so as to delimit said space between the sheet and the front side, the sheet being dimensioned so that a peripheral thereof is pressed against the bead of sealant upon placing this sheet against the front side of the vane.

In other words, the sheet is dimensioned to cover only the front side of the vane, which dramatically reduces the risk of tearing or perforating the sheet in comparison with a conventional hermetic bag. Indeed, the sharp parts or edges of the vane likely to perforate or tear the sheet are typically located at junction zones between different faces of the vane, in particular at the root and head of the vane, as well as at the leading and trailing edges. In the method of the invention, the sheet—or at least the part of the sheet delimiting the vacuumised space—does not cover or wrap such parts of the vane.

In addition, the invention avoids having excess parts of the sheet forming folds about the vane, which makes it possible to homogenise heating within the vane.

As a result of the reduced size of the sheet in comparison with a conventional hermetic bag, the manufacturing costs and environmental impact are reduced. The reduction in the size of the sheet additionally allows the number of vanes that can be simultaneously heated within an autoclave to be increased.

The time required to install such a sheet is also reduced in comparison with the time required to install a conventional hermetic bag.

More generally, the invention allows assembling reliability to be improved, especially by reducing risks of vacuum loss during heating.

According to a first alternative of the invention, depositing the bead of sealant and placing the sheet can be performed manually.

According to a second alternative of the invention, depositing the bead of sealant and placing the sheet can be carried out with the aid of a tooling capable of at least partially automating these operations.

In one embodiment pertaining to this second alternative, the body and the cover positioned on the junction face of the body can be disposed on a fixed part of a tooling and the sheet can be attached to a movable part of this tooling, the operation of placing the sheet comprising an operation of moving the movable part with respect to the fixed part of this tooling so as to dispose the sheet against the front side of the vane.

Such a positioning of the sheet allows quality and reproducibility of this operation to be improved, which allows assembling reliability to be further improved.

The bead of sealant may be deposited onto the sheet prior to the operation of moving the movable part of the tooling, the operation of depositing this bead of sealant onto the outer face of the body resulting from this operation of moving the movable part relative to the fixed part of the tooling.

Preferably, the method may comprise, after the operation of moving the movable part of the tooling, an operation of pressing this movable part against the bead of sealant so as to exert on this bead of sealant a predetermined compressive force capable of sealing said space included between the sheet and the front side.

Sealing can thus be perfectly controlled, which also leads to an improvement in assembling reliability.

The invention also relates to a tooling for implementing such a method, this tooling comprising a fixed part and a movable part, the fixed part being arranged to receive the body of the vane and the cover positioned on the junction face of this body, the movable part being arranged to fixedly receive the sheet and to be moved relative to said fixed part of this tooling so as to arrange the sheet against the front side of the vane.

Such tooling makes it possible especially to facilitate and automate placing of the sheet against the front side of the vane as well as depositing the bead of sealant onto the body of the vane. Assembling can thus be carried out more quickly and reliably.

To fixedly receive the sheet, the tooling may comprise a simple adhesive placed between the moving part and the sheet.

In one embodiment, the tooling may comprise a force transmitting device configured to exert said predetermined compressive force.

This force transmission device may comprise one or more elastic members such as springs.

Further advantages and characteristics of the invention will become apparent upon reading the following detailed, non-limiting description.

BRIEF DESCRIPTION OF THE DRAWINGS

The following detailed description makes reference to the appended drawings in which:

FIG. 3 is a schematic perspective view of a body of the vane of FIG. 2;

FIG. 4 is a schematic perspective view of a cover of the vane of FIG. 2;

FIG. 5 is a schematic transverse cross-section view of the vane of FIG. 2, equipped with a sheet and an air extraction device;

DETAILED DESCRIPTION OF EMBODIMENTS

Figure 1:
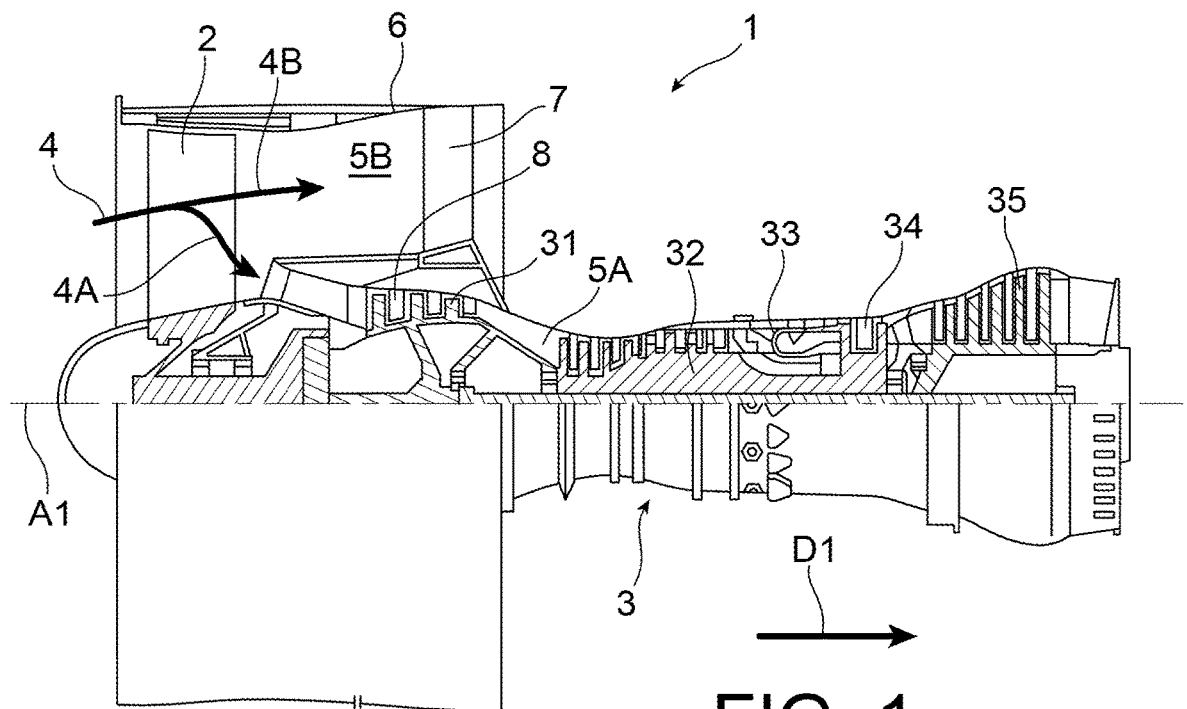
FIG. 1 is a schematic axial half cross-section view of a turbofan engine comprising an outlet guide vane.

With reference to FIG. 1, a twin spool turbofan engine 1, for an airliner type aircraft (not represented), is represented.

The turbojet engine 1 has a central longitudinal axis A1 about which its various components extend, in particular, from upstream to downstream of the turbojet engine 1, a fan 2 and a gas generator 3. Throughout this description, the terms "upstream" and "downstream" are defined in relation to a main direction D1 of gas flow within the turbojet engine 1. The gas generator 3 includes, from upstream to downstream, a low-pressure compressor 31, a high-pressure compressor 32, a combustion chamber 33, a high-pressure turbine 34 and a low-pressure turbine 35.

Conventionally, upon operating such a turbojet engine 1, an air flow 4 enters the turbojet engine 1 through an air intake, passes through the fan 2 and then divides into a central primary flow 4A and a secondary flow 4B. The primary flow 4A flows in a main circulation stream 5A for the gases passing through the compressors 31 and 32, the combustion chamber 33 and the turbines 34 and 35. The secondary flow 4B in turn flows in a secondary stream 5B surrounding the gas generator 3 and radially outwardly delimited by an external shell 6 of the turbojet engine 1.

In this example, the turbojet engine 1 comprises a ring of guide vanes 7 extending into the secondary stream 5B, downstream of the fan 2. These vanes 7 form an outlet guide vane (OGV) which connects the external shell 6 to a casing 8 surrounding the low pressure compressor 31. The vanes 7 are circumferentially spaced from each other and are used to straighten the secondary flow 4B exiting the secondary stream 5B. These vanes 7 may also provide a structural function.

The invention is more specifically concerned with the manufacture of such a vane 7.

Figure 2:
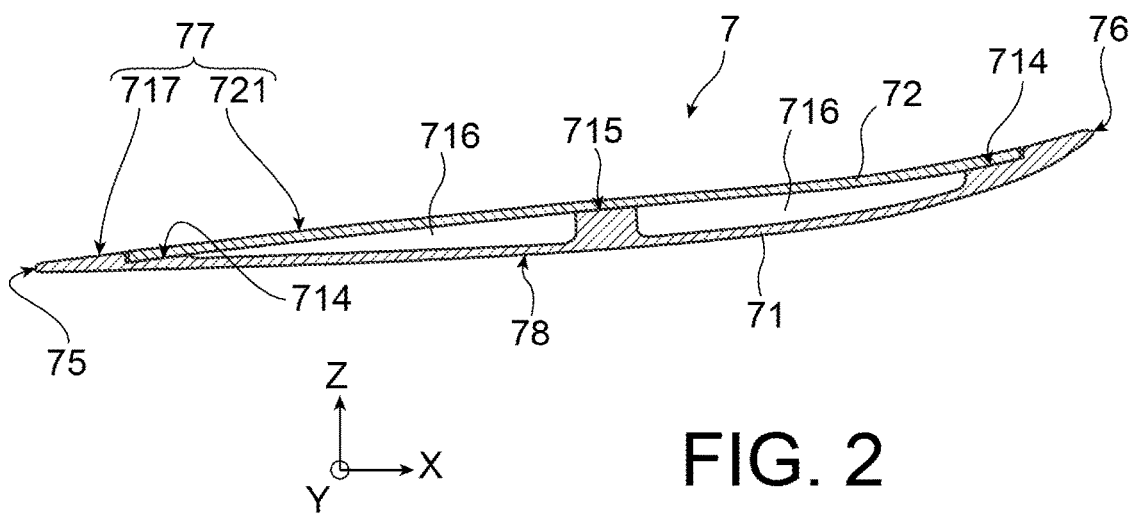
FIG. 2 is a transverse schematic cross-section view of a vane for an outlet guide vane of a turbojet engine such as that of FIG. 1.

A vane 7 in accordance with the invention is represented in FIG. 2.

In a known manner, the production of such a vane 7 comprises an operation of assembling two prefabricated parts. With reference to FIGS. 2 to 4, one of these parts forms a body 71, and the other part forms a cover 72.

In the example illustrated in FIG. 1, the vane 7 extends radially into the secondary stream 5B without axial tilt, that is without tilt along the longitudinal axis A1.

In the example of FIG. 3, the body 71 of the vane 7 has an axial tilt, the axis X of the reference frame of this figure being substantially parallel to the central longitudinal axis A1 of the turbojet engine 1 when this vane 7 is mounted to this turbojet engine 1.

The vane 7 comprises an aerodynamic part, for being exposed to the secondary flow 4B. The aerodynamic part of the vane 7 is located between a root 711 and a head 712 of this vane 7 (see FIG. 3).

In this example, the root 711 is used to attach the vane 7 to the casing 8 of the low pressure compressor 31, while the head 712 is used to attach the vane 7 to the external shell 6.

The root 711 and the head 712 of the vane 7 each comprise a platform 73 and 74, respectively, these platforms being for reconstituting the secondary stream 5B, circumferentially between the vanes 7.

With reference to FIGS. 2 and 3, the vane 7 forms a leading edge 75, a trailing edge 76, a front side 77 and a back side 78.

The body 71 of the vane 7 is shaped so as to define a junction face 713 for attaching the cover 72 to the body 71.

In the example of FIG. 3, the junction face 713 includes a peripheral part 714 forming a bulge running along the leading edge 75, the root 711, the trailing edge 76, and the head 712. This part 714 of the junction face 713 substantially forms a rectangle.

The junction face 713 also includes a portion 715 substantially forming a bulge along a diagonal of the rectangle formed by the part 714.

Between these parts 714 and 715 of the junction face 713, the body 71 includes recessed portions 716 for reducing its mass (see FIG. 2).

FIG. 4 exhibits an inner face of the cover 72 for facing the junction face 713 of the body 71, so that the cover 72 can be attached to the body 71 by bonding part of this inner face of the cover 72 to said junction face 713.

In order to carry out this assembling, the method of the invention comprises an operation of depositing a polymerisable resin onto the junction face 713 of the body 71.

For example, this resin may comprise an epoxy resin type liquid thermosetting polymer.

Alternatively or additionally, the resin may be deposited onto parts of the cover 72 which will be facing the junction face 713 after positioning the cover 72 on the body 71. It is preferred to deposit the resin onto the junction face 713 because this is structurally delimited, unlike the corresponding parts of the inner face of the cover 72, which are arranged on this inner face without surface discontinuity.

The method comprises an operation of positioning the cover 72 on the junction face 713 of the body 71, after depositing resin onto this junction face 713 and/or on said corresponding parts of the inner face of the cover 72.

This operation of positioning, or docking, the cover 72 and the body 71 is carried out so that an outer face 721 of the cover 72 and an outer face 717 of the body 71 together form said front side 77 of the vane 7 (see FIG. 2).

With reference to FIG. 5, the method of the invention comprises an operation of depositing a bead of sealant 101 and an operation of placing a sheet 102.

The bead of sealant 101 is deposited onto the outer face 717 of the body 71 of the vane 7, about the junction face 713—and more precisely about the peripheral part 714 of this junction face 713—along a closed line.

The sheet 102 is placed against the front side 77 of the vane 7, preferably using the tooling 9 described below with reference to FIGS. 6 to 8.

The sheet 102 is dimensioned such that a peripheral part thereof is pressed against the bead of sealant 101 upon placing the sheet 102 against the front side 77 of the vane 7.

The bead of sealant 101 is deposited in such a way as to delimit a space E9 included between the sheet 102 and the front side 77 of the vane 7, so as to vaccumise this space E9 (see later below).

The operations of depositing the bead of sealant 101 and placing the sheet 102 can be carried out manually, typically by depositing beforehand the bead of sealant 101 onto the outer face 717 of the body 71 and then pressing the sheet 102 against the front side 77 of the vane 7 and against the bead of sealant 101.

Figure 6:
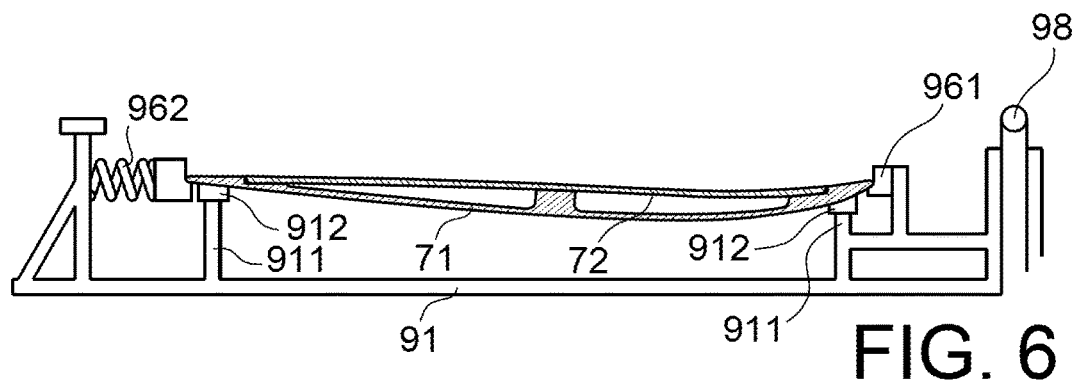
FIG. 6 is a schematic transverse cross-section view of a fixed part of a tooling for placing a sheet, receiving the vane of FIG. 2.
Figure 7:
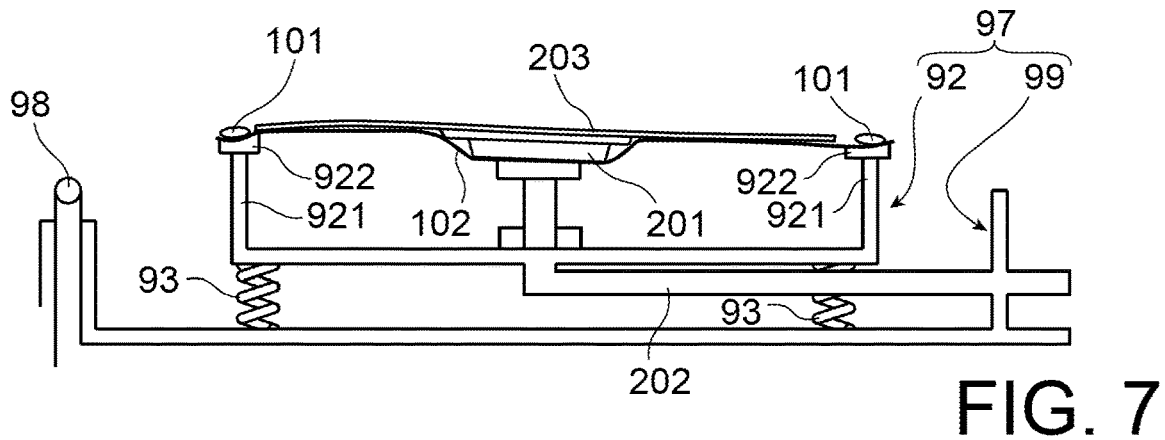
FIG. 7 is a schematic transverse cross-section view of a movable part of said tooling for placing a sheet, receiving a sheet and an air extraction device.
Figure 8:
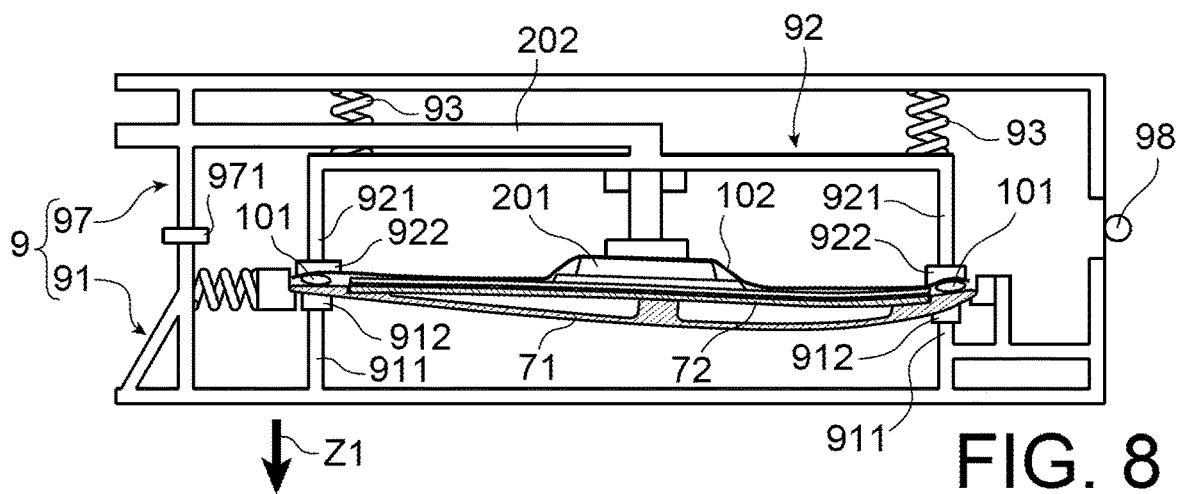
FIG. 8 is a schematic transverse cross-section view of said tooling for placing a sheet, showing the movable part of said tooling folded against the fixed part of this tooling.

These operations can also be carried out using the tooling 9 represented in FIGS. 6 to 8.

The complete tooling 9 is represented in a pressing configuration in FIG. 8. FIGS. 6 and 7 respectively show a lower part 91 forming a fixed part of this tooling 9 (FIG. 6) and an upper part 97 (FIG. 7) of this tooling 9 in an open configuration.

The fixed part 91 of the tooling 9 comprises reception elements 911 on top of which skids 912—for example made of Teflon—are arranged to receive the back side 78 of the vane 7. These reception elements 911 form an impression of the back side 78 of the vane 7.

The reception elements 911 are configured so that, when the cover 72 is positioned on the junction face 713 of the body 71, this cover 72 is kept so positioned under the action of gravity. Thus, when the tooling 9 is in the open configuration, the cover 72 and the body 71 can remain properly positioned relative to each other, as illustrated in FIG. 6.

With reference to FIG. 6, the fixed part 91 of the tooling 9 comprises means for laterally holding the body 71 of the vane 7, these lateral holding means including a stop element 961 and a compression spring 96.

The operation of positioning the cover 72 on the body 71 and/or the operation of depositing the resin may be carried out before or after positioning the body 71 on the reception elements 911 of the tooling 9.

The upper part 97 and the fixed lower part 91 of the tooling 9 are hinged to each other through a hinge member 98 for switching the tooling 9 from the open configuration (FIGS. 6 and 7) to the pressing configuration (FIG. 8).

With reference to FIGS. 7 and 8, the upper part 97 of the tooling 9 comprises a chassis 99 and a support part 92 forming a movable part of the tooling 9.

In this example, the movable support part 92 of the tooling 9 comprises support elements 921 with pads 922—for example made of Teflon—on top of it.

This movable support part 92 is arranged to fixedly receive the sheet 102, the latter being attached to the movable support part 92 by means of an adhesive, when the tooling 9 is in the open configuration (FIG. 7). The bead of sealant 101 is preferably deposited onto the sheet 102 after the latter has been attached to the movable support part 92, also when the tooling 9 is in the open configuration (FIG. 7).

The support elements 921 are arranged in such a way that, when the tooling 9 is in the pressing configuration, these support elements 921 are located in line with the outer face 717 of the body 71—in particular in line with parts of this outer face 717 receiving the bead of sealant 101—and facing the reception elements 911 of the fixed lower part 91 of the tooling 9 (see FIG. 8).

The support elements 921 form an impression of the outer face 717 of the body 71 of the vane 7.

When the tooling 9 switches from the open configuration (FIGS. 6 and 7) to the pressing configuration (FIG. 8), the movable support part 92—which belongs to the upper part 97 of the tooling 9—is moved with respect to the fixed lower part 91, resulting in an arrangement of the sheet 102 against the front side 77 of the vane 7 and, simultaneously, in depositing the bead of sealant 101 onto the outer face 717 of the body 71 of the vane 7.

Between the chassis 99 and the movable support part 92, springs 93 are mounted, which together with the movable support part 92, form a force transmission device. This force transmission device is configured to press this movable support part 92 against the bead of sealant 101 so as to exert on this bead 101 a predetermined compression force capable of sealing said space E9 included between the sheet 102 and the underside 77 of the vane 7. With reference to FIG. 8 illustrating the pressing configuration of the tooling 9, the compressed springs 93 tend in fact to move the movable support part 92 away from the chassis 99, according to a translational movement in a direction Z1, in the direction of the body 71 of the vane 7.

The predetermined compression force is typically equivalent to a pressure of 0.1 MPa.

In the pressing configuration (FIG. 8), the chassis 99 of the upper part 97 of the tooling 9 is held against the fixed lower part 91 by a lock 971, and the body 71 of the vane 7 is translationally locked along the direction Z1 by the reception elements 911 of the fixed lower part 91. As the movable support part 92 is movable with respect to the chassis 99 and the fixed lower part 91, the springs 93 can thus exert a force for pressing the movable support part 92 and consequently the sheet 102 against the bead of sealant 101, so as to seal the space E9.

In order to exert a substantially uniform compressive force on the bead of sealant 101, the impressions formed by the reception elements 911 of the fixed lower part 91 and by the support elements 921 of the movable support part 92 have to comply with relatively small dimensional and/or geometric tolerances. For this purpose, these impressions can be obtained by moulding the corresponding parts of the vane 7.

When the space E9 included between the sheet and the front side is sealed, this space is then vacuumised by means of a conventional air extraction device.

In a manner known per se, the air extraction device in this example comprises self-perforating connectors 201 which pass through the sheet 102, and a pumping system 202. Drainage felts 203 (see FIGS. 5 and 7) are interposed between the sheet 102 and the outer face 721 of the cover 72 of the vane 7. These drainage felts 203 are typically porous mats allowing air extracted from the vacuum space E9 as well as volatile compounds emitted by the resin when polymerised to be drained. These drainage felts 203 can also be used to absorb solvents or excess resin.

In this example, attaching the cover 72 on the body 71 of the vane 7 is carried out by polymerising the resin during a heating operation within an autoclave (not represented), at a temperature of between 160° C. and 180° C., in a configuration in which the cover 72 is pressed against the junction face 713 of the body 71 so as to exert a predetermined compression force on the resin. In this example, such pressing results from the pressure differential between, on the one hand, the space E9 included between the front side 77 of the vane 7 and the sheet 102, this space E9 being vacuumised as described above, and, on the other hand, the enclosure of the autoclave in which this assembly is placed.

What is claimed is:

1. A method for assembling a vane for an outlet guide vane of an aircraft turbofan engine, comprising:
   an operation of depositing a polymerisable resin onto a junction face of a body of said vane,
   an operation of positioning a cover of the vane onto the junction face covered with the resin so that an outer face of the cover and an outer face of the body together form a front side of the vane,
   an operation of placing a sheet against the front side of the vane,
   an operation of vacuumising a space included between the sheet and the front side,
   a heating operation capable of polymerising the resin and thus attaching the cover to the body of the vane,
   before or during the operation of placing the sheet against the front side of the vane, an operation of depositing a bead of sealant onto the outer face of the body, about the junction face of the body so as to delimit said space included between the sheet and the front side, the sheet being dimensioned so that a periphery thereof is pressed against the bead of sealant upon placing the sheet against the front side of the vane.

2. The method according to claim 1, wherein the body and the cover positioned on the junction face of the body are disposed on a fixed part of a tooling and in which the sheet is attached to a movable part of the tooling, the operation of placing the sheet comprising an operation of moving the movable part relative to the fixed part of the tooling so as to dispose the sheet against the front side of the vane.

3. The method according to claim 2, wherein the bead of sealant is deposited onto the sheet before the operation of moving the movable part of the tooling, the operation of depositing the bead of sealant onto the outer face of the body resulting from the operation of moving the movable part relative to the fixed part of the tooling.

4. The method according to claim 2, comprising, after the operation of moving the movable part of the tooling, an operation of pressing the movable part against the bead of sealant in such a way as to exert on the bead of sealant a predetermined compression force capable of sealing said space included between the sheet and the front side.

5. A tooling for implementing the method according to claim 4, comprising a force transmission device configured to exert said predetermined compression force, the tooling comprising a fixed part and a movable part, the fixed part being arranged to receive the body of the vane and the cover positioned on the junction face of the body, the movable part being arranged to fixedly receive the sheet and to be moved relative to said fixed part of the tooling so as to dispose the sheet against the front side of the vane.

6. The tooling according to claim 5, wherein the force transmitting device comprises one or more elastic members.

7. The tooling according to claim 6, wherein the one or more elastic members are springs.

8. A tooling for implementing the method according to claim 1, comprising a fixed part and a movable part, the fixed part being arranged to receive the body of the vane and the cover positioned on the junction face of the body, the movable part being arranged to fixedly receive the sheet and to be moved relative to said fixed part of the tooling so as to dispose the sheet against the front side of the vane.

* * * * *